(No Model.)
J. P. BURNHAM.
COMBINED PLANING AND BORING MACHINE.
No. 525,329. Patented Sept. 4, 1894.
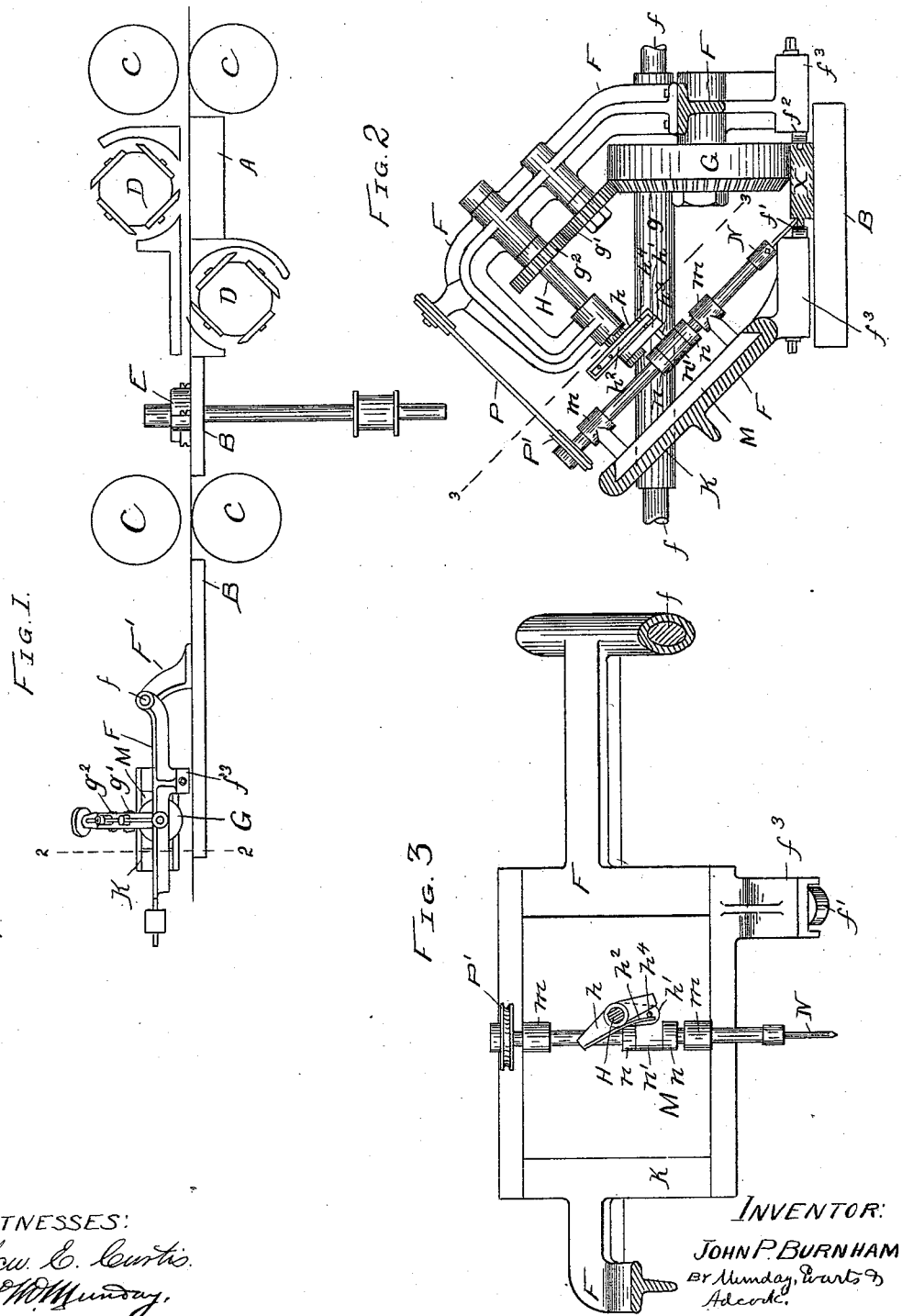
WITNESSES:
INVENTOR:
JOHN P. BURNHAM

UNITED STATES PATENT OFFICE.

JOHN P. BURNHAM, OF CHICAGO, ILLINOIS, ASSIGNOR TO THOMAS WILCE, OF SAME PLACE.

COMBINED PLANING AND BORING MACHINE.

SPECIFICATION forming part of Letters Patent No. 525,329, dated September 4, 1894.

Application filed January 11, 1894. Serial No. 496,483. (No model.)

*To all whom it may concern:*

Be it known that I, JOHN P. BURNHAM, a citizen of the United States, residing at Chicago, in the county of Cook and State of Illinois, have invented a new and useful Improvement in a Combined Planing and Boring Machine, of which the following is a specification.

My invention relates to improvements in machines for planing and boring boards, and more particularly to machines designed for use in the manufacture of hard wood floorings.

My invention consists in connection with a planing machine or its bed and feed rollers for moving the board along the bed, of a boring device comprising an operating wheel or roller resting upon and arranged and adapted to receive motion from the moving board as it issues from the planing mechanism, combined with a reciprocating slide adapted to travel back and forth in the direction of the board and upon which is mounted a boring tool adapted to move up and down in the direction of its length and a crank shaft and double, spring connected crank for communicating motion from said operating wheel or roller to the boring tool, whereby the boring tool is moved back and forth in the direction of the board and up and down as required, and the boring tool permitted while in engagement with the board to be carried or moved directly thereby, thus insuring the boring of the hole at right angles to the length of the board while it is in continuous motion and relieving the boring tool from injurious strain. The frame upon which the operating wheel and the reciprocating slide carrying the boring tool are both mounted is pivoted at one end to the frame of the planing machine and weighted at the other to give the operating wheel or roller the requisite pressure upon the traveling board. This frame is also furnished with two wheels or rollers, one adapted to bear against each edge of the board, and the frame is adapted to slide or move transversely to the direction of the board, so that the lateral position of the frame may thus be automatically adjusted in respect to the board in order to always bring the point of the boring tool in the right position in respect to the tongue on the board. This is necessary or desirable owing to the fact that the boards are frequently more or less sprung, bent or crooked.

In the accompanying drawings which form a part of this specification, and in which similar letters of reference indicate like parts throughout all the figures, Figure 1 is a diagram or skeleton view in side elevation of a machine embodying my invention. Fig. 2 is a cross section on line 2—2 of Fig. 1, and Fig. 3 is a section at right angles to the crank shaft and showing in elevation the boring tool and the reciprocating slide carrying the same.

In the drawings A represents the frame of the planing machine, B the bed or plate upon which the board rests as it passes through the machine, C C the feed rolls, D D the rotary cutter heads carrying the horizontal cutters or knives for surfacing the board and E E the rotary cutter heads for tonguing and grooving the edges of the board. All of these parts may be of any well known or suitable construction known to those skilled in the art; and as the construction of these parts is already familiar to those skilled in the art, I have simply indicated them in the drawings without showing their construction in detail.

F is the supplemental frame carrying the boring mechanism and pivotally connected at one end to suitable brackets F' secured to the frame of the planing mechanism. The frame F is pivoted on a horizontal rod $f$ secured to the bracket F' in such manner as to permit the frame F to slide or reciprocate laterally on the pivot rod in order to adjust itself to the board X or to any bends therein. To produce this automatic lateral adjustment of the boring frame, we provide the boring frame with two rollers $f'$ $f^2$ mounted on suitable brackets $f^3$ $f^3$ extending from the frame F, and which rollers bear one against one edge of the board X and the other against the opposite edge.

G is the operating wheel or roller journaled upon the frame F and adapted to rest upon and receive motion from the moving board X as it issues from the planing machine. This operating wheel or roller G is furnished with a gear or gear teeth $g$ by which motion is communicated to the crank shaft H through the connecting gears $g'$ $g^2$.

K is a guide way secured to the frame F and extending longitudinally in the direction of the board X, in which reciprocates the slide M upon which the boring tool N is mounted or journaled in suitable bearings $m\ m$ which permit the tool to move up and down and also to revolve. The boring tool N is furnished with two collars $n\ n$ fixed thereto, and between which fits a connecting arm or sleeve $n'$.

The crank shaft H is furnished with a double crank $h\ h'$ connected together by a spring $h^2$. The crank arm $h$ is fast upon the crank shaft H, and the crank arm $h'$ is loose upon this shaft and connected by a pin $h^3$ with the sleeve or connecting block $n'$ on the boring tool. The spring $h^2$ is preferably secured to the fast crank arm $h$ and bears against a pin or projection $h^4$ on the loose crank arm $h'$. The purpose of this double spring connected crank on the crank shaft for communicating motion to the boring tool and the slide carrying the same is to permit the boring tool to be carried forward by the moving board independently of the crank arm $h$ which is fast on the crank shaft, thus enabling the boring tool while in engagement with the board X to be carried forward by and at the exact speed of the moving board, the spring $h^2$ yielding and thus permitting the loose crank $h'$ to move faster than the fast crank $h$. In this way I communicate the necessary up and down movement to the boring tool and the necessary longitudinally reciprocating movement to the boring tool by a very simple mechanism, while at the same time permitting the boring tool while in engagement with the moving board to be carried or moved directly thereby independently of the connecting mechanism driven by the operating wheel or roller G.

The pivotal and laterally adjustable frame F is or may be weighted at its free end to give the operating wheel G the necessary pressure upon the moving board X. The boring tool is rotated or driven by means of a belt P receiving motion from the planing machine and running upon a pulley P' on the boring tool.

The board, the movement of which drives the operating wheel G, is itself driven by the feed wheels C C of the planing machine.

I claim—

1. In a planing machine the combination of the bed and feed rolls for moving the board, of an operating wheel or roller receiving motion from the moving board, a longitudinally reciprocating slide provided with an up and down reciprocating boring tool, a crank shaft receiving motion from said operating wheel, and a double spring connected crank for communicating motion to the boring tool and the slide carrying the same, substantially as specified.

2. In a planing machine the combination with the bed upon which the board rides and feed rollers, of a boring tool, the longitudinally reciprocating slide carrying the same, an operating wheel resting upon and receiving motion from the moving board, and a crank shaft having a spring or yielding connection with the boring tool, whereby the slide carrying the boring tool is moved back and forth and the boring tool up and down, and at the same time the boring tool permitted to move forward with the board while in engagement therewith, substantially as specified.

3. In a planing machine, the combination with the bed and feed rollers, of a pivoted frame F carrying an operating wheel resting upon and receiving motion from the moving board and a boring tool and mechanism for operating the boring tool from said operating wheel or roller, substantially as specified.

4. In a planing machine the combination with the bed and feed rollers, of a laterally adjustable boring tool frame furnished with wheels or rollers engaging the opposite edges of the board to automatically adjust the position of the boring tool laterally in respect to the board, substantially as specified.

5. In a planing machine, the combination with the bed, and feed rolls, of a boring tool frame F pivotally connected to the frame and adapted to slide laterally to adjust itself laterally to the position of the board, substantially as specified.

6. In a planing machine the combination with the bed and feed rolls, of a boring mechanism comprising a laterally adjustable pivoted frame F carrying an operating wheel or roller G adapted to rest upon and receive motion from the moving board, a longitudinally reciprocating slide M carrying an up and down moving boring tool N furnished with collars $n\ n$ and connecting arm or sleeve $n'$, and crank shaft H geared to said operating wheel G and furnished with a spring crank arm connected with said arm or block $n'$ on the boring tool, substantially as specified.

7. In a planing machine the combination with the bed and feed rolls, of a boring mechanism comprising a laterally adjustable pivoted frame F carrying an operating wheel or roller G adapted to rest upon and receive motion from the moving board, a longitudinally reciprocating slide M carrying an up and down moving boring tool N furnished with collars $n\ n$ and connecting arm or sleeve $n'$ and crank shaft H geared to said operating wheel G and furnished with a fast crank arm $h$ and loose crank arm $h'$ connected together by a spring $h^2$, said loose crank arm $h'$ having a pin $h^3$ connecting with said arm or block $n'$, substantially as specified.

8. The combination with the laterally adjustable boring tool frame F of the rollers $f'$ $f^2$ adapted to engage the edges of the board to automatically adjust the boring frame laterally in respect to the board, and a boring tool mounted upon said frame, substantially as specified.

JOHN P. BURNHAM.

Witnesses:
  H. M. MUNDAY,
  EDMUND ADCOCK.